United States Patent
Saeki

(10) Patent No.: US 11,914,988 B2
(45) Date of Patent: Feb. 27, 2024

(54) CLOUD APPLICATION DEPLOYMENT DEVICE AND CLOUD APPLICATION DEPLOYMENT METHOD

(71) Applicant: Hitachi, Ltd., Tokyo (JP)

(72) Inventor: Yuji Saeki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 50 days.

(21) Appl. No.: 17/894,531

(22) Filed: Aug. 24, 2022

(65) Prior Publication Data
US 2023/0236818 A1 Jul. 27, 2023

(30) Foreign Application Priority Data
Jan. 7, 2022 (JP) .................................. 2022-001731

(51) Int. Cl.
*G06F 8/65* (2018.01)
*G06N 5/04* (2023.01)

(52) U.S. Cl.
CPC ........ *G06F 8/65* (2013.01); *G06N 5/04* (2013.01)

(58) Field of Classification Search
None
See application file for complete search history.

(56) References Cited

U.S. PATENT DOCUMENTS 11,558,451 B2 * 1/2023 Sgobba .................. G06N 3/08
2020/0287923 A1 * 9/2020 Raghavendra .......... G06N 3/088
2020/0320379 A1 * 10/2020 Watson ................. G06N 3/08

OTHER PUBLICATIONS

Papaioannou, "An Architecture for Evaluating Distributed Application Deployments in Multi-Clouds", 2013, IEEE (Year: 2013).*
Doukha, "Deployment of Containerized Deep Learning Applications in the Cloud", 2020, IEEE (Year: 2020).*
J. L. Berral, et al., "AI4DL: Mining Behaviors of Deep Learning Workloads for Resource Management", [online], USENIX the Advanced Computing Association, in 12th USENIX Workshop HotCloud, [Search Nov. 4, 2022], Internet<URL:https://www.usenix.org/system/files/hotcloud20_paper_berral.pdf>.

* cited by examiner

*Primary Examiner* — Hossain M Morshed
(74) *Attorney, Agent, or Firm* — Volpe Koenig

(57) ABSTRACT

A phase classification model of a cloud application deployment device calculates a feature vector for each time period from resource usage data for each time period when an application is executed, clusters the feature vectors for each time period, and validates a result of the clustering to determine which phase the feature vector belongs to. Validation between a feature vector of a new application and a feature vector belonging to a cluster of a known phase is performed, and it is determined whether each time period belongs to the known phase or an unknown phase on the basis of a degree of the validation. The resource usage of a computer node for each phase is inferred, and application deployment is performed on the basis of an inference result.

10 Claims, 13 Drawing Sheets

RESOURCE USAGE TABLE 201

| 201a<br>COMPUTER NODE ID | 201b<br>APPLICATION ID | 201c<br>TIME PERIOD ID | 201d<br>MEASUREMENT TIME | 201e<br>CPU | 201f<br>VIRTUAL MEMORY CAPACITY [MB] | 201g<br>STORAGE CAPACITY [MB] | 201h<br>NETWORK BANDWIDTH [Mbps] |
|---|---|---|---|---|---|---|---|
| CN001 | ap001 | tw001 | 20211130 101020 | 20 | 2 | 40 | 100 |
| CN002 | ap002 | tw002 | 20211130 101030 | 10 | 4 | 22 | 200 |
| ... | ... | ... | ... | ... | ... | ... | ... |

FIG. 4

FEATURE VECTOR INFORMATION 211

| TIME PERIOD ID 201a | FEATURE VECTOR 201b | CLUSTER ID 211c |
|---|---|---|
| tw001 | (1, 2, ..., 5) | 4 |
| tw002 | (2, 6, ..., 10) | 1 |
| ... | ... | ... |

FIG. 5

RESOURCE USAGE INFERENCE TABLE 212

| CLUSTER ID 212a | CPU 212b | VIRTUAL MEMORY CAPACITY [MB] 212c | STORAGE CAPACITY [MB] 212d | NETWORK BANDWIDTH [Mbps] 212e |
|---|---|---|---|---|
| 6 | 14 | 6 | 35 | 120 |
| 3 | 12 | 8 | 22 | 252 |
| ... | ... | ... | ... | ... |

FIG. 6

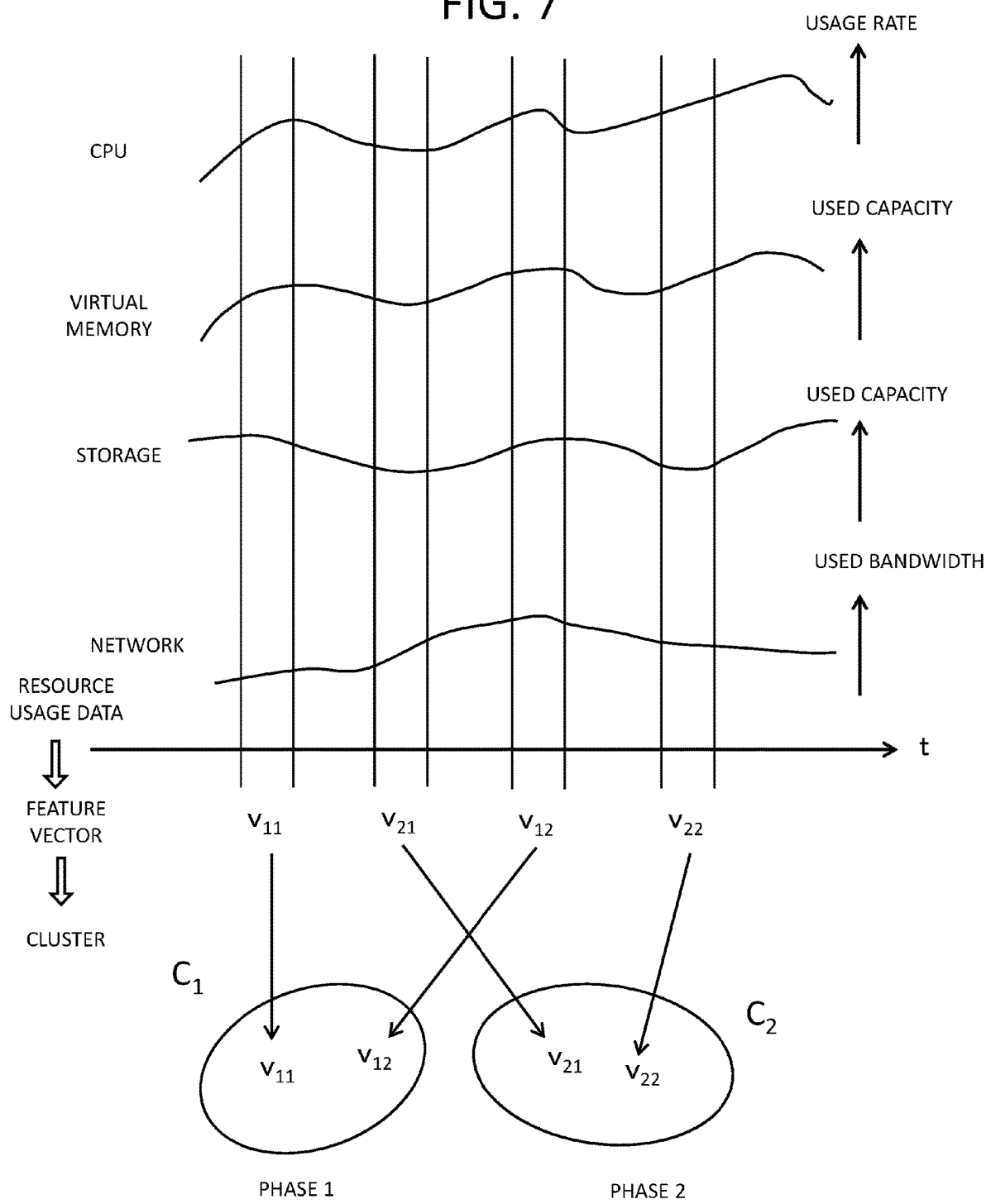

CLOUD APPLICATION DEPLOYMENT DEVICE AND CLOUD APPLICATION DEPLOYMENT METHOD

BACKGROUND OF THE INVENTION

1. Field of the Invention

The present invention relates to a cloud application deployment device and a cloud application deployment method, and particularly, to a cloud application deployment device and a cloud application deployment method that are suitable for improving the efficiency of cloud resource usage and optimally deploying applications to a cloud in cloud computing.

2. Description of the Related Art

In a cloud computing environment, in a case in which application software (hereinafter, simply referred to as an "application"), such as data analysis or machine learning, is containerized and executed on a large scale, it is necessary to set the resource usage limits of a CPU, a memory, and the like in a container according to the actual resource usage of the application, in order to efficiently use the computer resources (hardware resources and software resources) of the cloud and to prevent an abnormal end of a process caused by insufficient memory and the like.

Here, the container is a concept that summarizes the environment required to execute applications, such as commands or libraries, on the host OS. The container makes it possible to construct a plurality of execution environments lighter than a virtual machine (VM) according to the related art on one server.

In order to shorten the execution time as much as possible and to avoid the abnormal end caused by insufficient memory and the like, in practice, a user who executes the containerized applications on a large scale using the cloud needs to estimate resource usage to be larger than the actual computational resource usage of the CPU, the memory, and the like by the application and to set the value of the resource usage limit of the container. When the resource usage is estimated to be large and the application is deployed on the basis of this premise, the efficiency of cloud resource usage is reduced, and the user pays an excessive cost. Here, the deployment of the application means deploying and setting the application on the cloud so as to be operable and making the application in an operable state. In general, in order to accurately size the application (estimate the size of resources) on the cloud, it is necessary to set the resource usage limit of the container on the basis of the resource usage measured by performing a test according to user requirements in advance and to deploy the application in the cloud.

As a method that automatically adjusts the size of the container (auto scaling) without performing a sizing operation before deployment, there is a method which accumulates and analyzes the resource usage data of the application executed in the past to calculate the resource usage limit of the container.

For example, in J. L. Berral, et. al., "AI4DL: Mining Behaviors of Deep Learning Workloads for Resource Management", [online], USENIX THE ADVANCED COMPUTING ASSOCIATION, in 12$^{th}$ USENIX Workshop HotCloud, [Search Nov. 4, 2022], Internet<URL:https://www.usenix.org/system/files/hotcloud20_pape r_berral.pdf>, a method is used which clusters low-dimensional feature vectors extracted from resource usage data as multidimensional time-series data to classify the operation of an application into a small number of execution phases. In general, it is known that, in this method for calculating the resource usage limit for each of the phases in which the resource usage patterns are similar, the frequency of wasting resources waste and exceeding limits is low.

In J. L. Berral, et. al., "AI4DL: Mining Behaviors of Deep Learning Workloads for Resource Management", [online], USENIX THE ADVANCED COMPUTING ASSOCIATION, in 12$^{th}$ USENIX Workshop HotCloud, [Search Nov. 4, 2022], Internet<URL:https://www.usenix.org/system/files/hotcloud20_pape r_berral.pdf>, a Conditional Restricted Boltzmann Machine (CRBM) method which is a deep learning method is used for phase classification.

Further, in relation to this, for transfer learning in which machine learning is performed on another problem on the basis of a trained neural network, US Patent Application Publication No. 2020/0320379 discloses a technique which determines whether or not to train a new model on the basis of the similarity of the existing neural network training data to new data and creates training data for the new model on the basis of the similarity between the existing neural networks In J. L. Berral, et. al., "AI4DL: Mining Behaviors of Deep Learning Workloads for Resource Management", [online], USENIX THE ADVANCED COMPUTING ASSOCIATION, in 12$^{th}$ USENIX Workshop HotCloud, [Search Nov. 4, 2022], Internet<URL:https://www.usenix.org/system/files/hotcloud20_pape r_berral.pdf>, for phase classification, low-dimensional feature vectors extracted from resource usage data as multidimensional time-series data are clustered using the CRBM method which is a method of deep learning, and the resource usage in the cluster is evaluated by a graph and a tree. According to J. L. Berral, et. al., "AI4DL: Mining Behaviors of Deep Learning Workloads for Resource Management", [online], USENIX THE ADVANCED COMPUTING ASSOCIATION, in 12$^{th}$ USENIX Workshop HotCloud, [Search Nov. 4, 2022], Internet<URL:https://www.usenix.org/system/files/hotcloud20_pape r_berral.pdf>, it is possible to perform phase classification considering not only CPU load and memory usage but also many metrics. However, since CRBM, which is a kind of neural network, is used to extract low-dimensional feature vectors, a large amount of resource usage data is required to train the CRBM. In addition, in order to perform machine learning and clustering accurately, it is desirable that the number of phases classified as a result is small. Therefore, basic usage is to learn the data accumulated for each application and to create a classification model. This configuration is effective in a case in which it is applied to a dedicated cloud in which similar applications are executed on a large scale, such as a cloud in which the purpose of calculation is limited to machine learning. However, it is difficult to apply this configuration to a general-purpose cloud used for various purposes to improve the accuracy of resource evaluation.

Further, in the example described in J. L. Berral, et. al., "AI4DL: Mining Behaviors of Deep Learning Workloads for Resource Management", [online], USENIX THE ADVANCED COMPUTING ASSOCIATION, in 12$^{th}$ USENIX Workshop HotCloud, [Search Nov. 4, 2022], Internet<URL:https://www.usenix.org/system/files/hotcloud20_pape r_berral.pdf>, it is assumed that the resource usage data in a case in which the container resource limit is large is analyzed to infer the actual resource usage of the application and the container resource usage limit is automatically adjusted. Therefore, in a case in which the container resource limit is small, it is difficult to infer whether or not a service level required by the user, that is, the requirement of application execution performance can be satisfied.

In addition, the inference of the application execution performance needs to be performed even in a case in which the computing resources of the cloud are insufficient or in a case in which the user wants to allocate resources with an emphasis on cost. In general, in order to infer the application execution performance in a case in which the container resource limit is small, there is a method which performs a test while comprehensively changing parameters, such as the container resource limit and the amount of input data of the application, and creates a regression expression for inferring the resource limit value that meets the user's requirements on the basis of the measured performance before deploying the application.

However, since the application executed on the cloud is configured by a combination of various types of microserviced software including open sources, in practice, it is difficult to require a system implementer to exhaustively test all containers before an application is deployed.

Further, in order to apply the transfer learning method disclosed in US Patent Application Publication No. 2020/0320379 to the resource usage data of a new application executed on the cloud and to perform transfer learning on a new phase classification model, it is necessary to create training data for transfer learning on the basis of the similarity between the training data for the existing phase classification model and the resource usage data of the new application. However, it is difficult to create training data for a new model on the basis of the similarity with the existing training data since the execution phases of a plurality of existing applications appear in any combination in the resource usage pattern of the new application.

An object of the invention is to provide a cloud application deployment device and a cloud application deployment method that can improve the efficiency of cloud resource usage and optimally deploy an application when a new application is deployed on a container of the cloud.

SUMMARY OF THE INVENTION

Preferably, a cloud application deployment device according to the invention deploys application software in a cloud environment on the basis of resource usage when the application software is executed. The cloud application deployment device stores resource usage data of a computer node for each time period when the application software is executed, calculates a feature vector for each time period from the resource usage data for each time period when the application software is executed, clusters the feature vectors for each time period to create a cluster, sets a time series of the time periods corresponding to the feature vectors of the cluster including the feature vectors as a phase of the application software, includes a phase classification model that calculates the feature vector for each time period from the resource usage data for each time period when the application software is executed, clusters the feature vectors for each time period to create the cluster, and validates a result of the clustering to determine which phase the feature vector belongs to, collects resource usage data of new application software for each time period when the new application software is executed, performs validation between a feature vector for each time period when the new application software is executed and the feature vector belonging to the cluster created by the phase classification model of the known phase for which the phase classification model has already been obtained, determines whether each time period belongs to the known phase or an unknown phase on the basis of a degree of the validation, infers the resource usage of the computer node for each phase of the application software, calculates a container resource usage limit of the computer node in the cloud environment on the basis of the resource usage of the computer node for each phase of the application software, and deploys the application software on the basis of the container resource usage limit.

According to the invention, it is possible to provide a cloud application deployment device and a cloud application deployment method that can improve the efficiency of cloud resource usage and optimally deploy an application when a new application is deployed on a container of the cloud.

BRIEF DESCRIPTION OF THE DRAWINGS

FIG. 4 is a diagram illustrating an example of a resource usage table;

FIG. 5 is a diagram illustrating an example of a feature vector information table;

FIG. 6 is a diagram illustrating an example of a resource usage inference table;

FIG. 7 is a diagram illustrating the concept of the phase of an application, a feature vector, and a cluster and a relationship therebetween;

DETAILED DESCRIPTION OF THE PREFERRED EMBODIMENTS

Figure 1:
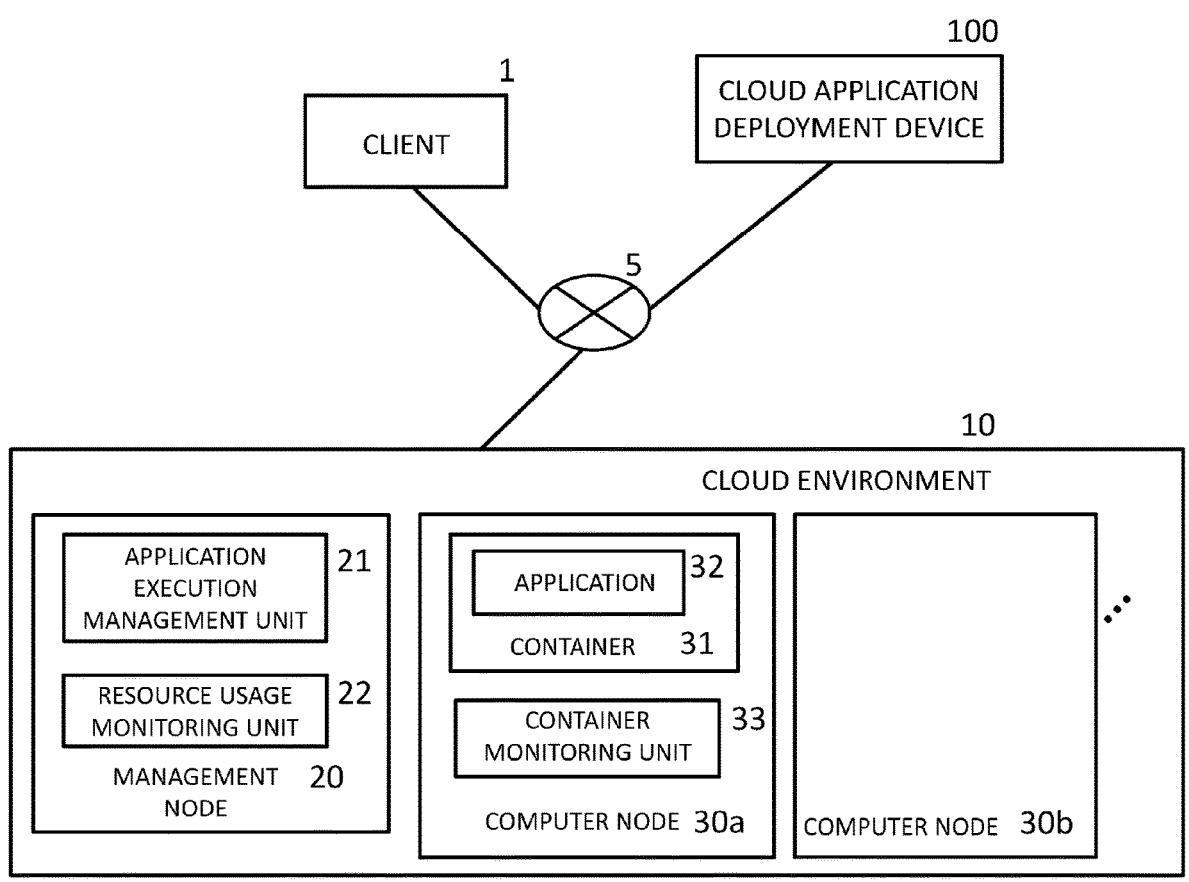
FIG. 1 is a functional configuration diagram illustrating a cloud system in which a cloud application deployment device is used.

Hereinafter, each embodiment of the invention will be described with reference to FIGS. 1 to 12.

Embodiment 1

Hereinafter, Embodiment 1 of the invention will be described with reference to FIGS. 1 to 11.

First, an outline of the calculation of resource usage related to a cloud application deployment device according to the invention will be described.

In the deployment of applications on a cloud according to the invention, in a cloud computing environment in which a containerized application is executed, an object is a system that automatically calculates a resource usage limit of a container on the basis of multidimensional time-series data analysis of accumulated resource usage data. It is assumed that, for main applications executed on the cloud, resource usage data in the past execution is accumulated, the model, disclosed in J. L. Berral, et. al., "AI4DL: Mining Behaviors of Deep Learning Workloads for Resource Management", [online], USENIX THE ADVANCED COMPUTING ASSOCIATION, in $12^{th}$ USENIX Workshop HotCloud, [Search Nov. 4, 2022], Internet<URL:https://www.usenix. org/system/files/hotcloud20_pape r_berral.pdf>, has already been trained, classification into execution phases is performed, and a container resource usage limit can be set on the basis of a resource usage profile in each phase such that the frequency of the abnormal end caused by waste of resources and exceeding the limit is reduced.

In this cloud operation, there is an attempt to apply the existing phase classification model to new applications in order to enable the setting of an optimum container usage limit for applications that have not been executed much in the past.

For example, in CRBM that extracts a feature vector from resource usage data, which is the method described in J. L. Berral, et. al., "AI4DL: Mining Behaviors of Deep Learning Workloads for Resource Management", [online], USENIX THE ADVANCED COMPUTING ASSOCIATION, in $12^{th}$ USENIX Workshop HotCloud, [Search Nov. 4, 2022], Internet<URL:https://www.usenix.org/system/files/ hotcloud20_pape r_berral.pdf>, validation that checks whether the feature vector characterizes the original resource usage data can be performed, and it is possible to detect which portion of the resource usage data of a new application is a time period that can be classified into the phase by the existing model, according to the degree of validation. In this way, the resource usage data is divided into a known phase that can be classified by the existing model and the remaining unknown phase, and data of the unknown phase is used to perform machine learning on a new classification model. As a result, as the number of known phases in the execution of a new application increases, the resource usage of the new application can be inferred with higher accuracy.

There is a method (auto encoder) which trains a neural network that encodes resource usage data, which is high-dimensional time-series data, into a low-dimensional feature vector and a neural network that decodes the feature vector into the original resource usage data at the same time and uses decoding accuracy evaluated by a loss function. In this case, a method which evaluates the accuracy of decoding the feature vector into the original resource usage data can be used as a validation method. That is, a phase classification model corresponding to the main application is a model that has been trained specifically for a specific application execution pattern, and it is considered that the validation result of the model for a new application execution pattern means a difference between the execution patterns of the main application and a new application. Therefore, the feature vector is weighted according to the difference between the execution patterns. Then, the feature vectors indicating the execution patterns of a plurality of applications are combined. The feature vectors indicating the execution patterns of different applications are clustered, and statistical processing is performed on the CPU and memory usages for each cluster to calculate a resource usage limit.

In addition, the following is considered: in a case in which a model, which executes a test for sizing on the existing application to infer the rate at which an execution time slows down when the container resource limit is small, has already been created, the same inference model can be applied to a new application classified into the known phase. In this way, it is possible to increase the number of portions whose execution time can be inferred, without executing the test for sizing on all applications.

Next, a configuration of a cloud system in which the cloud application deployment device is used will be described with reference to FIGS. 1 to 3.

As illustrated in FIG. 1, in the cloud system, a client 1, a cloud environment 10, and a cloud application deployment device 100 are connected by a network 5. The network 5 is usually a global network, such as the Internet, and may be a local area network (LAN) topology.

The client 1 is an information processing device that requests a cloud service from the cloud environment 10 and receives services, such as the reception of the requested calculation results and searches, from the cloud environment 10.

The cloud environment 10 functionally includes a management node 20 and computer nodes 30 (represented by 30a, 30b, in FIG. 1).

The management node 20 is a node that monitors the execution and resource usage of an application 32 in each computer node 30 and includes an application execution management unit 21 and a resource usage monitoring unit 22. Here, the resources in the cloud environment are hardware resources such as a CPU, a memory, an input/output device, and a network.

The computer node 30 is a node that implements the functions of a computer and includes a container 31, into which the application 32 and commands and libraries (not illustrated) for executing other applications are packaged, and a container monitoring unit 33 that monitors the behavior of the container 31.

Resource usage data of the CPU, the memory, the input/output, communication, and the like at the time of the execution of the application 32 monitored by the container monitoring unit 33 is collected by the resource usage monitoring unit 22 that operates in the management node 20 and is accumulated in a resource usage DB (which will be described below) 200 of the cloud application deployment device 100 through the network 5.

The cloud application deployment device 100 is a device that estimates the resource usage of the application executed in the cloud environment 10 and performs optimum application deployment such that the application can exhibit its original performance without causing an abnormal end.

Next, a functional configuration of the cloud application deployment device will be described with reference to FIG. 2.

Figure 2:
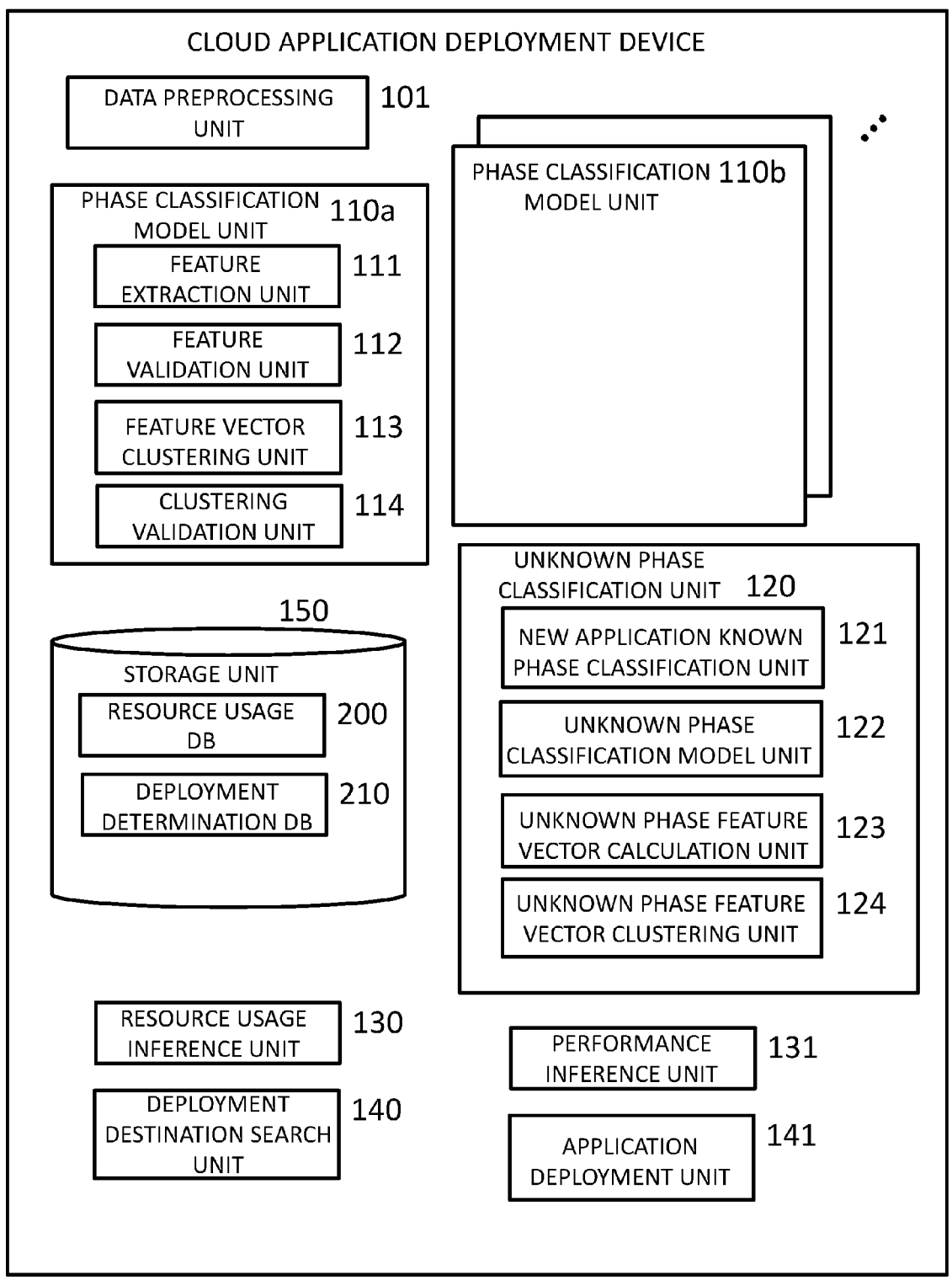
FIG. 2 is a functional configuration diagram illustrating the cloud application deployment device.

As illustrated in FIG. 2, the cloud application deployment device 100 includes, as the functional configuration, a data preprocessing unit 101, phase classification model units 110 (represented by 110a, 110b, . . . in FIG. 2), an unknown phase classification unit 120, a resource usage inference unit 130, a performance inference unit 131, a deployment destination search unit 140, an application deployment unit 141, and a storage unit 150.

The data preprocessing unit 101 is a functional unit that processes the accumulated resource usage data to be used as training data for the phase classification model unit.

The phase classification model unit 110 is a functional unit that implements a phase classification model in machine learning in this embodiment. The phase classification model is created for each application that is executed for a long time in the cloud environment 10 and that has a sufficient amount of data accumulated in the resource usage DB 200 for training the model.

The phase classification model unit 110 includes a feature extraction unit 111, a feature validation unit 112, a feature vector clustering unit 113, and a clustering validation unit 114.

The feature extraction unit 111 is a functional unit that extracts a low-dimensional feature vector from multidimensional time-series data obtained by preprocessing the data of the resource usage DB 200.

The feature validation unit 112 is a functional unit which validates that the feature vector expresses the original resource usage pattern. The feature vector clustering unit 113 is a functional unit that clusters the feature vectors based on the extracted features. The clustering validation unit 114 is a functional unit that validates the results of clustering by the feature vector clustering unit 113.

The unknown phase classification unit 120 is a functional unit that classifies whether the execution phase of an application is a known phase or an unknown phase.

The unknown phase classification unit 120 includes a new application known phase classification unit 121, an unknown phase classification model unit 122, an unknown phase feature vector calculation unit 123, and an unknown phase feature vector clustering unit 124.

The new application known phase classification unit 121 is a functional unit that classifies whether the execution phase of a new application is the known phase or the unknown phase. Here, the "known phase" is a phase that can be classified by the existing phase classification model according to the features of the resource usage of the execution phase of the application, and the unknown phase is an execution phase that is not the "known phase", that is, a phase that is not capable of being classified by the existing phase classification model. The unknown phase classification model unit 122 is a functional unit that performs the machine learning of the phase classification model for the resource usage data of the phase classified as the unknown phase. The unknown phase classification model unit 122 has the same structural and functional configurations as the above-described phase classification model unit 110. The unknown phase feature vector calculation unit 123 is a functional unit that weights the feature vectors with weighting coefficients according to the difference between the execution patterns of a plurality of applications and combines the feature vectors to calculate an unknown phase feature vector (which will be described in detail below). Decoding accuracy can be used to calculate the weighting coefficients as described above.

The unknown phase feature vector clustering unit 124 is a functional unit that clusters the feature vectors in the time period of the unknown phase calculated by the unknown phase feature vector calculation unit 123.

The resource usage inference unit 130 is a functional unit that infers the resource usage for the execution phase of the application. For the known phase of the application, the resource usage inference unit 130 can infer the resource usage using, for example, a resource usage inference function created on the basis of the existing training data in the past long-time execution.

The performance inference unit 131 is a functional unit that infers the performance of executing an application on the container from the result of the test executed on the application on the container. In a case in which a slowdown inference function that indicates performance degradation on the computer is defined for the usage of each resource, the performance inference can be performed by the slowdown inference function.

The deployment destination search unit 140 is a functional unit that searches for the deployment destination of an application on the basis of the container resources and the resource usage when the application is executed.

The application deployment unit 141 is a functional unit that outputs the deployment destination of the application searched by the deployment destination search unit 140 and gives an instruction to the application execution management unit 21 of the management node 20.

The storage unit 150 is a functional unit that stores the data used by the cloud application deployment device 100. The storage unit 150 stores, for example, the resource usage database (DB) 200 and a deployment determination DB 210. The resource usage DB 200 stores, for example, a table indicating the resource usage of each type of resource for each predetermined time period in the time series for each computer node 30 that executes applications. The deployment determination DB 210 stores a table that is used by the cloud application deployment device 100 to deploy an application and stores, for example, information of a feature vector for each time period for each computer node 30 in the cloud environment in which applications are executed.

Next, the hardware and software configurations of the cloud application deployment device 100 will be described with reference to FIG. 3.

Figure 3:
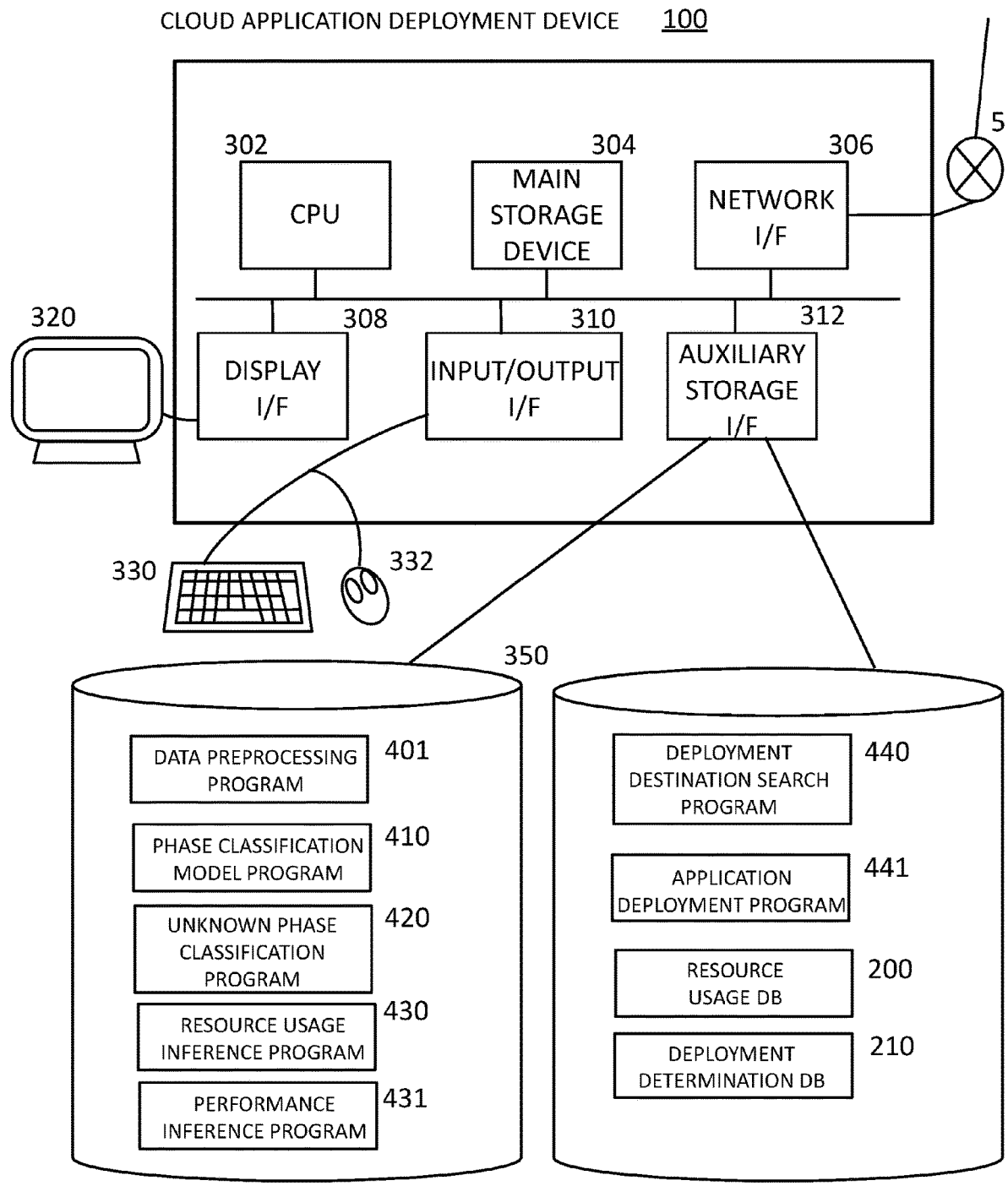
FIG. 3 is a diagram illustrating hardware and software configurations of the cloud application deployment device.

The hardware configuration of the cloud application deployment device 100 is implemented by, for example, a general information processing device such as a personal computer illustrated in FIG. 3.

In the cloud application deployment device 100, a central processing unit (CPU) 302, a main storage device 304, a network interface (I/F) 306, a display I/F 308, an input/output I/F 310, and an auxiliary storage I/F 312 are connected by a bus.

The CPU 302 controls each unit of the cloud application deployment device 100, loads a necessary program to the main storage device 304, and executes the program.

The main storage device 304 is generally a volatile memory, such as a RAM, and stores programs executed by the CPU 302 and data to be referred to by the CPU 302.

The network I/F 306 is an interface for connection to the network 5.

The display I/F 308 is an interface for connecting a display device 320 such as a liquid crystal display (LCD).

The input/output I/F 310 is an interface for connecting the input/output device. In the example illustrated in FIG. 3, a keyboard 330 and a mouse 332, which is a pointing device, are connected.

The auxiliary storage I/F 312 is an interface for connecting an auxiliary storage device such as a hard disk drive (HDD) 350 or a solid state drive (SSD).

The HDD 350 has a large storage capacity and stores a program for carrying out this embodiment. A data preprocessing program 401, a phase classification model program 410, an unknown phase classification program 420, a resource usage inference program 430, a performance inference program 431, a deployment destination search program 440, and an application deployment program 441 are installed in the cloud application deployment device 100.

The data preprocessing program 401, the phase classification model program 410, the unknown phase classification program 420, the resource usage inference program 430, the performance inference program 431, the deployment destination search program 440, and the application deployment program 441 are programs for implementing the functions of the data preprocessing unit 101, the phase classification model unit 110, the unknown phase classification unit 120, the resource usage inference unit 130, the performance inference unit 131, the deployment destination search unit 140, and the application deployment unit 141, respectively.

In addition, the HDD 350 stores the resource usage DB 200 and the deployment determination DB 210.

Next, a data structure used in the cloud application deployment device will be described with reference to FIGS. 4 to 6.

A resource usage table 201 is a table that stores resource usage for each time period for each computer node 30 executing applications and is stored in the resource usage DB 200.

As illustrated in FIG. 4, the resource usage table 201 includes fields of a computer node ID 201$a$, an application ID 201$b$, a time period ID 201$c$, a measurement time 201$d$, a CPU 201$e$, virtual memory capacity 201$f$, storage capacity 201$g$, and a network bandwidth 201$h$.

An identifier that uniquely identifies a computer node executing an application is stored in the computer node ID 201$a$. Specifically, the cloud application deployment device stores specifications indicating the hardware of the computer node 30 (a CPU model No., the number of cores, a CPU operating frequency, a CPU benchmark, main memory capacity, storage capacity, a network bandwidth, an IO topology, and the like), which is not illustrated. An identifier that uniquely identifies the application software to be executed is stored in the application ID 201$b$. An identifier that uniquely identifies the period from which time is cut out in order to analyze the resource usage is stored in the time period ID 201$c$. The time period ID 201$c$ is a unique primary key in the system and has a unique value even when the computer node ID and the application are changed. The initial time of the time period is stored in the format of, for example, yyyymmddhhmmss in the measurement time 201$d$. The time period is stored, for example, in units of 10 seconds as illustrated in FIG. 4. The usage rate of the CPU for the time period is stored, for example, as a percentage in the CPU 201$e$. The used capacity of the virtual memory used by the application is stored, for example, in MB units in the virtual memory capacity 201$f$. The used capacity of the storage (the auxiliary storage device such as the SSD or the HDD) used by the application is stored, for example, in MB units in the storage capacity 201$g$. The bandwidth used by the application is stored in the network bandwidth 201$h$. In addition, in this example, only the CPU, the virtual memory, the storage capacity, and the network bandwidth are shown as the resource usage. However, other resource usages, such as an IO usage bandwidth and the usage rate of the CPU, may be stored.

Next, an example of a feature vector information table will be described with reference to FIG. 5.

A feature vector information table 211 is a table that stores information related to the feature vector created for each time period when an application is executed and is stored in the deployment determination DB 210.

As illustrated in FIG. 5, the feature vector information table 211 includes fields of a time period ID 211$a$, a feature vector 211$b$, and a cluster ID 211$c$.

As in the time period ID 201$c$ in the resource usage table 201, an identifier that uniquely identifies the period from which time is cut out in order to analyze the resource usage is stored in the time period ID 211$a$. The value of the feature vector calculated by the feature vector extraction unit 111 for the time period ID indicated by the time period ID 211$a$ is stored, for example, in a list format corresponding to the number of elements in the feature vector 211$b$. A cluster ID indicating which cluster the feature vector indicated by the feature vector 211$b$ determined by the feature vector clustering unit 113 belongs to is stored in the cluster ID 211$c$. It is assumed that the cluster ID is unique in the system.

A resource usage inference table 212 is a table that stores the resource usage inferred for the cluster of the feature vectors for each resource type and includes fields of a cluster ID 212$a$, a CPU 212$b$, virtual memory capacity 212$c$, storage capacity 212$d$, and a network bandwidth 212$e$ as illustrated in FIG. 6.

A cluster ID indicating which cluster the feature vector belongs to is stored in the cluster ID 212$a$, similarly to the cluster ID 211$c$ of the feature vector information table 211. The inferred values corresponding to the resource types of the CPU 201$e$, the virtual memory capacity 201$f$, the storage capacity 201$g$, and the network bandwidth 201$h$ in the resource usage table 201 inferred by the resource usage inference unit 130 are stored in the CPU 212$b$, the virtual memory capacity 212$c$, the storage capacity 212$d$, and the network bandwidth 212$e$, respectively.

Next, the outline of the phase of an application, a feature vector, a cluster, and resource calculation and the relationships therebetween will be described with reference to FIG. 7.

FIG. 7 illustrates a CPU, virtual memory capacity, storage capacity, and a network bandwidth as a resource usage pattern when a certain computer node 30 executes a certain application.

The feature extraction unit 111 of the cloud application deployment device 100 regards this resource usage pattern as multidimensional time-series data and calculates feature vectors $v_{11}$, $v_{12}$, $v_{21}$, $v_{22}$, . . . for each time period. The feature vectors can be calculated from the multidimensional time-series data, using the CRBM, Long Short-Term Memory (LSTM) AutoEncoder, and Time Delay Embedding methods which are known as the existing machine learning methods.

Then, the feature vector clustering unit 113 of the cloud application deployment device 100 performs classification by clustering using, for example, a k-means method which is a kind of unsupervised learning. The k-means method is a method that clusters the feature vectors extracted from resource usage data on the basis of a certain number of distances from the cluster center of gravity calculated from the feature vectors extracted from training data. Further, the clustering validation unit 114 of the cloud application deployment device 100 can validate the clustering result according to the degree to which the distance of the feature vector from the cluster center of gravity deviates from the distribution of the feature vectors extracted from the training data. In FIG. 7, $v_{11}$, $v_{12}$, . . . belong to a cluster $C_1$, and $v_{21}$, $v_{22}$, . . . belong to a cluster $C_2$.

In this embodiment, it is considered that one cluster of the feature vectors indicates one phase.

Next, how to classify the execution phase of a new application into the known phase or the unknown phase will be described.

The above-described resource usage pattern is regarded as multidimensional time-series data, and the classification of whether the time period when an application is executed belongs to the known phase and the unknown phase is calculated on the basis of the feature vector for each time period.

As described above, for example, in the CRBM which extracts a feature vector from resource usage data, validation that checks whether or not the feature vector characterizes the original resource usage data can be performed, and it is possible to detect which portion of the resource usage data of a new application is a time period that can be classified into the phase by the existing model, according to the degree of validation. That is, when the feature vector of the known phase is obtained, the degrees of validation of the feature vector for the execution phase of a new application can be compared to classify whether the time period when the application is executed belongs to the known phase or the unknown phase.

For example, the degree of validation between the feature vector belonging to the cluster of the known phase and the feature vector for the execution phase of a new application is obtained, and the average value of the degrees of validation calculated for the feature vectors of the cluster is calculated. In a case in which it is defined that the feature vector becomes more similar as the degree of validation becomes larger, when the value is equal to or less than a predetermined value, it is determined that the feature vector for the execution phase of the new application belongs to the known phase.

In addition, as described above, there is the following method as the validation method: a method (auto encoder) which trains a neural network that encodes resource usage data, which is high-dimensional time-series data, into a low-dimensional feature vector and a neural network that decodes the feature vector into the original resource usage data at the same time and uses decoding accuracy evaluated by a loss function. In this case, a method which evaluates the accuracy of decoding the feature vector into the original resource usage data can be used as the validation method.

Next, a method for calculating the feature vector belonging to the unknown phase from the known phase will be described.

The known phase is the execution phase of the application in which the cluster of the feature vectors is obtained by the existing phase classification model.

Here, it is assumed that the feature vectors belonging to the cluster of the known phase are $v_1, v_2, \ldots, v_i, \ldots$.

Here, it is assumed that the execution phase of a new application includes the unknown phase. Here, it is considered that feature vectors of a certain unknown phase are redefined by combining the feature vectors $v_1, v_2, \ldots, v_i, \ldots$ belonging to the cluster of the known phase. The known phase may be spread across a plurality of applications.

Feature vectors u for the time period of a certain unknown phase are combined by (Expression 1) using the feature vectors for the time period of the following known phase.

[Equation 1]

$$u = \prod_i w_j v_i \quad \text{(Expression 1)}$$

Here, $w_i$ is a weighting coefficient and is, for example, a scalar value of 0 to 1 calculated by the degree of validation when the time period of the unknown phase is validated by the feature vector $v_i$. It is defined that, the features become more different as each feature vector becomes closer to 0 and become more similar as each feature vector becomes closer to 1.

As described above, $w_i$ can be defined from the decoding accuracy evaluated from the loss function in a case in which the neural network that encodes resource usage data, which is high-dimensional time-series data, into a low-dimensional feature vector, and the neural network that decodes the feature vector into the original resource usage data are trained at the same time.

Π means taking the direct product of the feature vectors of indexes. For example, a resultant vector of n-dimensional feature vectors $v_1=(a_{11}, a_{12}, \ldots, a_{1n})$ and $v_2=(a_{21}, a_{22}, \ldots, a_{2n})$ is a 2n-dimensional vector illustrated in the following (Expression 2).

[Equation 2]

$$u = \prod_{i=1}^{2} w_i v_i = \quad \text{(Expression 2)}$$

$$w_1 v_1 \times w_2 v_2 = (w_1 a_{11}, \ldots, w_1 a_{1n}, w_2 a_{21}, \ldots, w_2 a_{2n})$$

Then, the resource usage of each of (the CPU, the virtual memory capacity, the storage capacity, and the network band) is inferred from a resource usage inference function ResUse represented by the following (Expression 3) using the resource usage data in the time periods of the feature vectors belonging to the cluster C as a parameter.

[Equation 3]

(CPU,virtual memory capacity,storage capacity, and
network band)=ResUse{{resource usage data in
time periods of feature vectors belonging to
C}} (Expression 3)

Then, a certain margin of resource usage can be added to the resource usage to calculate a container resource usage limit value. The container resource usage limit value can be obtained by statistically processing the resource usage data in the time periods of the feature vectors belonging to the cluster. For example, extreme outliers are excluded, and an arithmetic average is calculated for each of (the CPU, the virtual memory capacity, the storage capacity, and the network bandwidth) of the resource usage data for each feature vector v.

Next, a process executed by the cloud application deployment device will be described with reference to FIGS. 8A to 10.

Figure 8A:
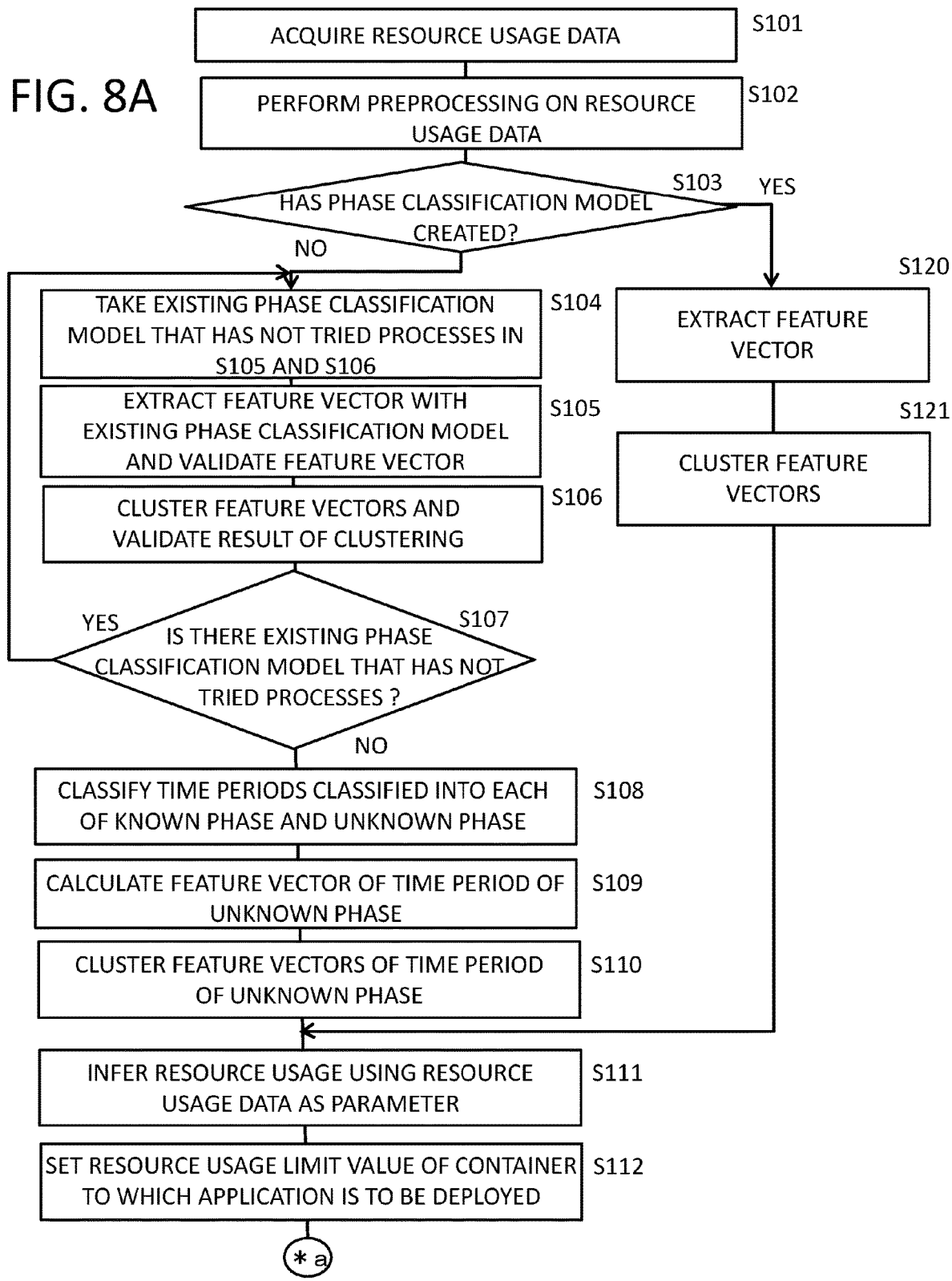
FIG. 8A is a flowchart illustrating the calculation of a container usage limit and a learning process for an unknown phase (Part 1)

First, the calculation of the container usage limit and a learning process for the unknown phase will be described with reference to FIGS. 8A and 8B.

The cloud application deployment device 100 acquires data acquired from the resource usage table 201 of the resource usage DB 200 (S101).

Then, the data preprocessing unit 101 of the cloud application deployment device 100 performs preprocessing on the resource usage data that has been acquired from the resource usage table 201 of the resource usage DB 200 and was executed by the computer node 30 of the hardware in the past (S102).

Data preprocessing is, for example, a process that performs data interpolation to process data into time-series data at regular intervals in a case in which the resource usage data is collected at different time intervals and performs statistical processing, such as calculating the average value of the resource usage data per computer node, in the case of an application executed in parallel by a plurality of computer nodes.

Then, the cloud application deployment device 100 determines whether or not a phase classification model has been created for the application to be modeled (S103). When the phase classification model for the application to be modeled has not been created (S103: NO), the cloud application deployment device 100 proceeds to S104. When the phase classification model has been created (S103: YES), the cloud application deployment device 100 proceeds to S120. The case in which the phase classification model has not been created is a case in which the frequency of execution of the application is low. The case in which the phase classification model has been created is a case in which the phase classification model has been trained with the past resource usage data for the execution of the application and a trained phase classification model has been created.

When the phase classification model for the application has been created, the feature extraction unit 111 of the cloud application deployment device 100 extracts feature vectors (S120), and the feature vector clustering unit 113 clusters the feature vectors (S121). Then, the process proceeds to S110.

When the phase classification model has not been created, the existing phase classification model that has not tried processes in the following S105 and S106 is taken (S104), and the feature extraction unit 111 of the cloud application deployment device 100 extracts the feature vectors using the existing phase classification model, and the feature validation unit 112 validates the feature vectors (S105).

Then, the feature vector clustering unit 113 of the cloud application deployment device 100 performs the clustering of the feature vectors by the existing phase classification model, and the clustering validation unit 114 validates the clustering result S106).

Then, the cloud application deployment device 100 determines whether or not there is an existing phase classification model that has not tried the processes in S105 and S106 (S107). When there is an existing phase classification model that has not tried the processes (S107): YES), the cloud application deployment device 100 returns to S104. When there is no existing phase classification model (S107: NO), the cloud application deployment device 100 proceeds to S108.

Then, the new application known phase classification unit 121 of the cloud application deployment device 100 performs classification into the time period that is determined to be classified into the known phase by the phase classification model for any existing application and the time period of the remaining unknown phase, as a validation result of the clustering by each existing phase classification model (S108).

For the time period belonging to the unknown phase, the feature vectors across different applications obtained by weighting the feature vectors extracted by the existing phase classification model of the cloud application deployment device 100 with the validation result are combined ((Expression 1)) to calculate the feature vector of the time period belonging to the unknown phase (S109). The unknown phase feature vector clustering unit 124 clusters the feature vectors of the time periods of the unknown phase calculated by the unknown phase feature vector calculation unit 123 (S110).

Then, the resource usage inference unit 130 of the cloud application deployment device 100 infers resource usage using the resource usage data as a parameter (S111, (Expression 3), (Expression 4)) and sets the resource usage limit value of the container to which the application is to be deployed on the basis of the inferred resource usage (S112).

Figure 8B:
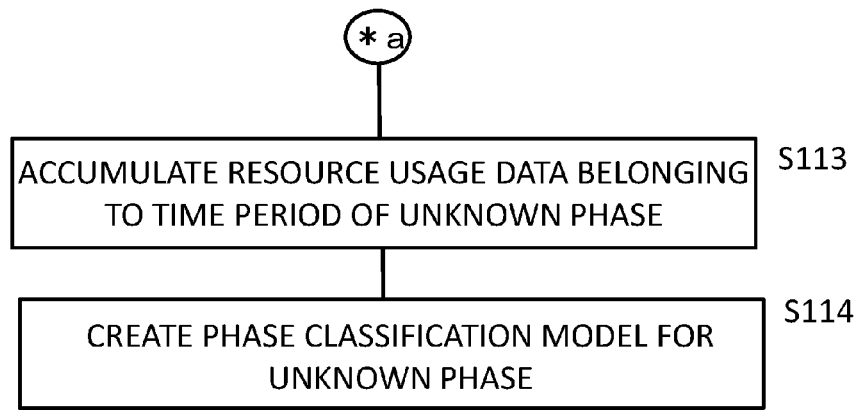
FIG. 8B is a flowchart illustrating the calculation of the container usage limit and the learning process for the unknown phase (Part 2)

In addition, the cloud application deployment device 100 accumulates the resource usage data belonging to the time period of the unknown phase (FIG. 8B: S113), and the unknown phase classification model training unit 122 performs machine learning in a stage in which the resource usage data of the unknown phase is accumulated to create a phase classification model for the unknown phase (S114).

Figure 9:
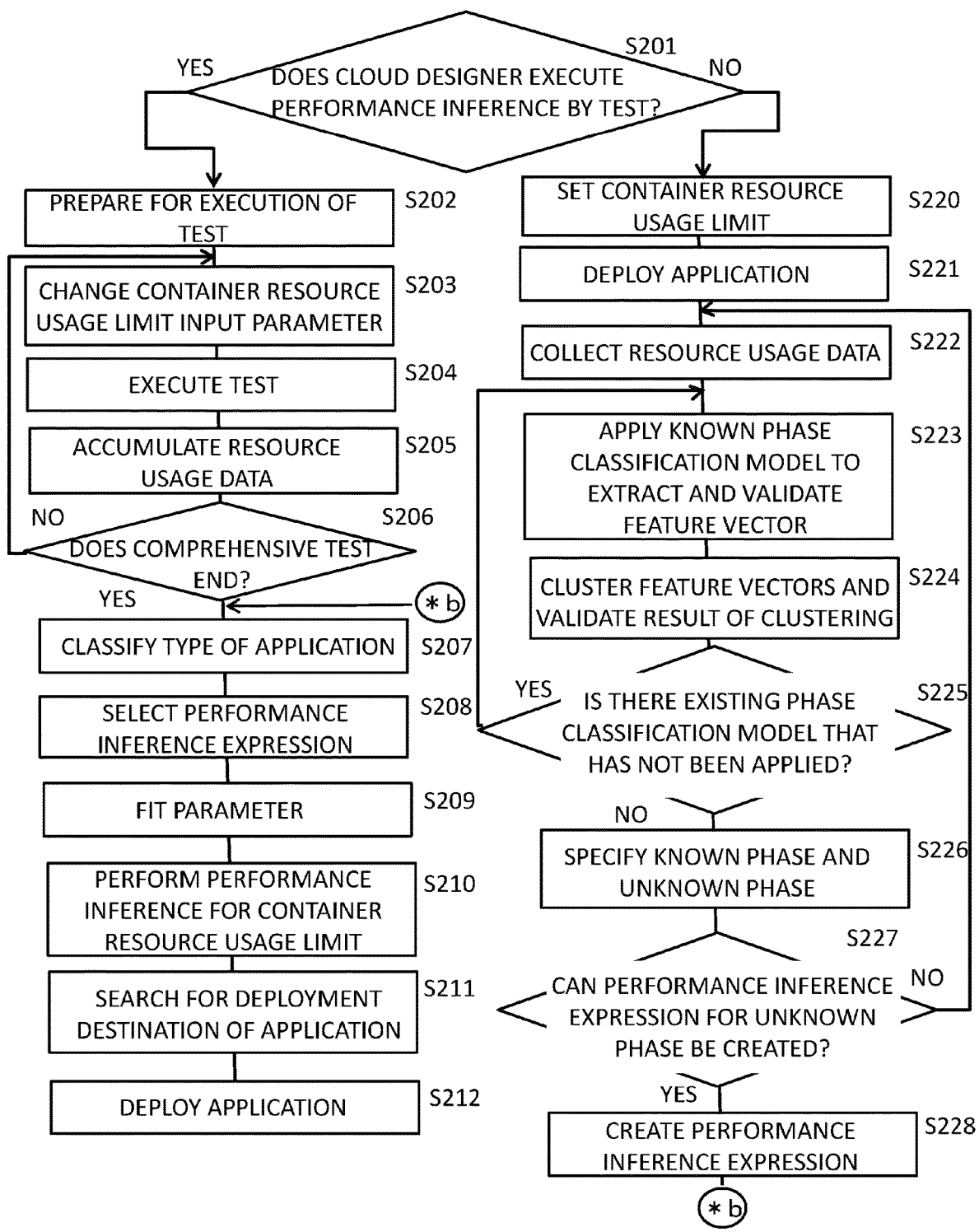
FIG. 9 is a flowchart illustrating a process until a cloud designer deploys an application.

Next, a process until a cloud designer performs application deployment on a new application will be described with reference to FIG. 9.

This method is effective in deploying an application in a case in which the container resource limit is small because the test is executed while comprehensively changing parameters such as the container resource limit and the amount of input data of the application.

First, the cloud designer determines whether or not to infer the performance of the application by the test (S201). In a case in which the performance inference by the test is performed (S201: YES), the process proceeds to S202. In a case in which the performance inference by the test is not performed (S201: NO), the process proceeds to S220.

In a case in which the performance inference by the test is performed, for example, preparation for executing the test, such as the creation of input data for the test with different sizes, is performed (S202).

Then, the cloud application deployment device 100 acquires the input data size and parameters of a new application (S203), executes the test (S204), measures, for example, the execution time and resource usage of the application, and accumulates resource usage data (S205).

Then, it is determined whether the cloud designer has performed an exhaustive test or an exhaustive test has been performed by the cloud application deployment device under the preset conditions by the processes in S203 to S205 (S206). When it is determined that the exhaustive test has been performed (S206: YES), the process proceeds to S207. When it is determined that the exhaustive test has not been performed (S206: NO), the process returns to S203 and the test is continued.

When the exhaustive test has been performed, the cloud designer classifies the type of the application (S207) and selects a performance inference expression for that type on the basis of the measurement result (S208). The type of the application is, for example, a communication application, an AI application, or a data analysis application. The reason why the type of the application is classified in this way is that, since which explanatory variable the performance is highly dependent on differs depending on the type of the application, the type of regression expression for performance inference created in advance is selected first. The performance inference expression can be created by creating a regression expression that infers the execution performance of the application when the container resource usage limit value, the input data size, and the parameters are applied as explanatory variables on the basis of the measurement results. Further, at this time, unknown parameters in the regression equation can be determined using, for example, a least-square method for the measurement results.

Then, the performance inference unit 131 of the cloud application deployment device 100 fits parameters applied to the performance inference expression (S209) and performs performance inference for the container usage limit using the selected performance inference expression (S210).

Then, the deployment destination search unit 140 of the cloud application deployment device 100 searches for the deployment destination of the application (S211), and the application deployment unit 141 deploys the application in the cloud (S212).

Meanwhile, it is assumed that the cloud designer does not perform performance inference using the test. In many cases, the applications executed in the cloud are developed in combination with the existing microservices including open sources. In this case, it is desirable to infer the application execution performance without executing the test while comprehensively changing the container resource usage limit of each component. In a case in which the inference expression is not created before the start of an operation in this way, the amount of resources where the application operates with a margin is allocated as the initial setting, and application deployment is performed.

In a case in which the performance inference by the test is not performed, the cloud designer sets a limit for the container S220), and the application deployment unit 141 of the cloud application deployment device 100 deploys the application in the cloud (S221).

Then, the resource usage data in a case in which the application is operated in the container is collected (S222).

Then, the feature extraction unit 111 and the feature validation unit 112 of the existing phase classification model of the cloud application deployment device 100 apply the phase classification model of the known phase to the collected resource usage data to extract and validate the feature vector (S223).

Then, the feature vector clustering unit 113 and the clustering validation unit 114 of the existing phase classification model of the cloud application deployment device 100 cluster the feature vectors and validate the clustering result (S224).

Then, the processes in S223 and S224 are repeatedly performed on the collected resource usage data. When there is no existing phase classification model that has not been applied (S225: NO), the process proceeds to S226.

Then, the new application known phase classification unit 121 of the cloud application deployment device 100 classifies the time period for which a new application has been executed into the known phase or the unknown phase according to each verification result of the clustering (S226).

Here, it is assumed that the performance inference expression has already been obtained for the known phase of the application.

Then, the cloud application deployment device 100 determines whether or not the performance inference expression can be created for the unknown phase (S227). When the performance inference expression can be created for the unknown phase (S227: YES), the performance inference expression for the unknown phase is created S228). Then, the process proceeds to S207, and performance inference for the container usage limit is performed by the performance inference expression of the known phase and the performance inference expression of the unknown phase obtained through Steps S208 and S209 (S210).

The performance inference expression can be created for the unknown phase in a case in which the past execution conditions and result data capable of creating the inference expression of the application are sufficiently accumulated.

When the performance inference expression is not capable of being created for the unknown phase (S227: NO), the process returns to S222.

Figure 10:
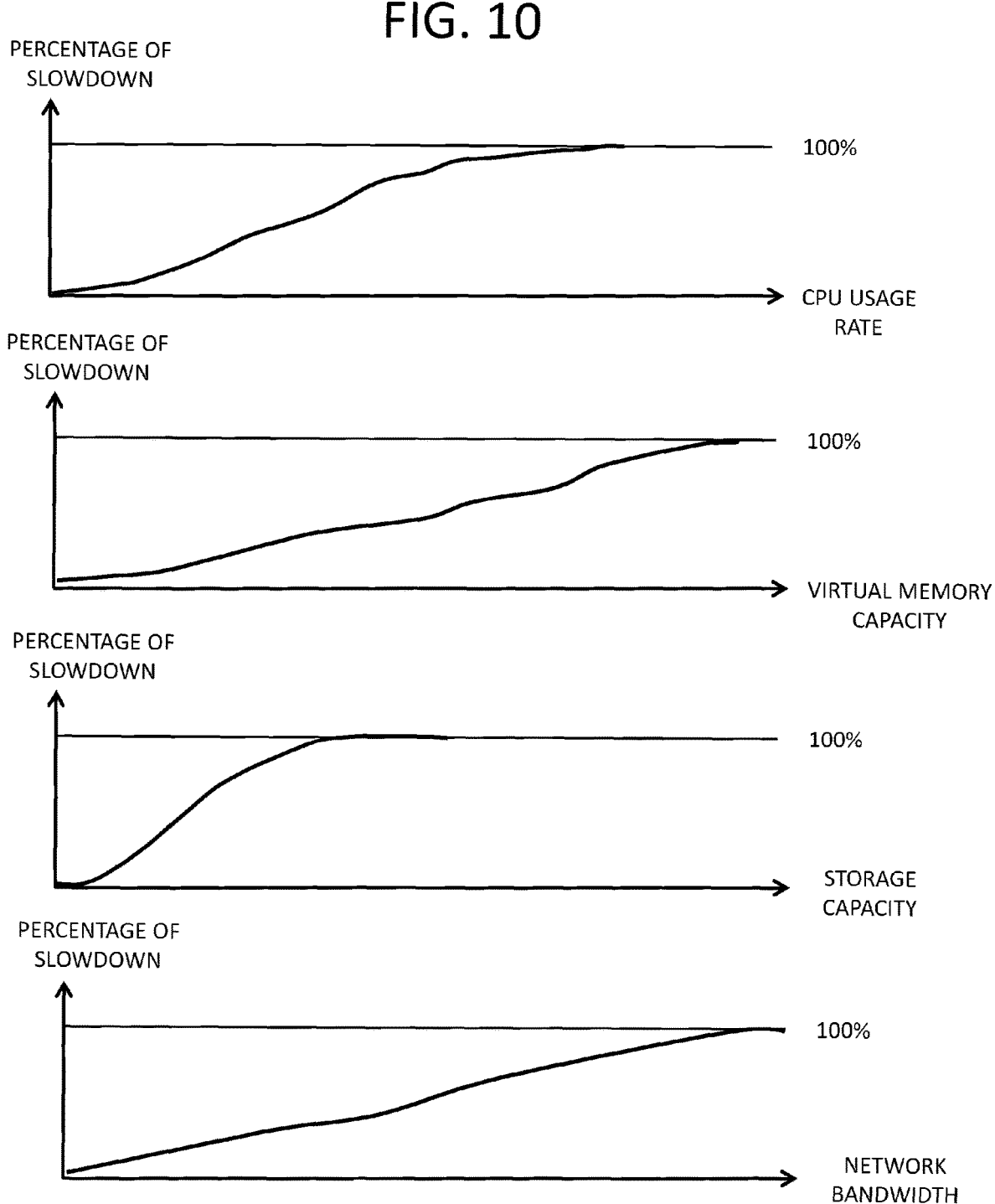
FIG. 10 is a diagram illustrating an example of a slowdown performance inference function.

The performance inference expression in S208 and S228 may be any performance inference expression expressed by the slowdown function illustrated in FIG. 10. The slowdown function is a function indicating the degradation (slowdown) of the execution performance of the computer node 30 for each resource usage, has, for example, the usage of the CPU, the virtual memory capacity, the storage capacity, and the network bandwidth as parameters, and indicates the percentage of the performance degradation of the application having a value range of 0 to 100%. The percentage is 0% when there is no performance degradation and is 100% when the performance degradation exceeds an allowable value.

As described above, in a case in which the slowdown function indicating the percentage at which the application execution time slows down when the container resource usage limit is small has already been created by the execution of the test for sizing the application that has been executed for a long time, the same inference function can be applied to a new application including the time period classified into the known phase. Therefore, the test for sizing is not necessarily performed on all of the applications, and it is possible to increase the number of portions in which the execution time can be inferred.

Figure 11:
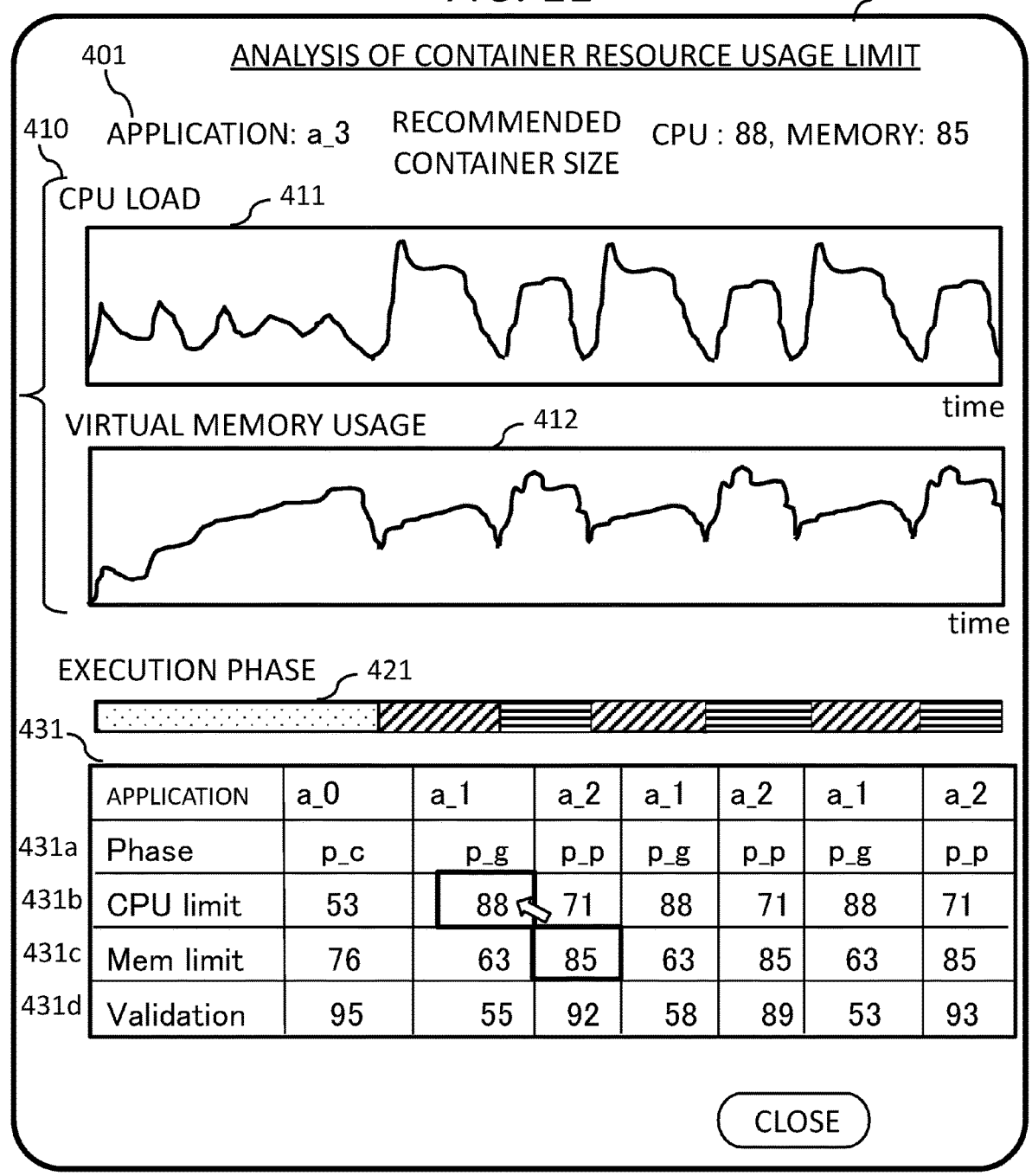
FIG. 11 is a diagram illustrating an example of a container resource usage limit value analysis screen.

Next, a user interface of the cloud application deployment device will be described with reference to FIG. 11.

When the cloud designer makes a mistake in setting the container resource usage limit value, the application ends abnormally due to insufficient memory and the like. Therefore, it is desirable to check a recommended value calculated by the performance inference unit before the user deploys the container. Therefore, on a container resource usage limit value analysis screen 400 illustrated in FIG. 11, as a basis for calculating the recommended value, a fluctuation pattern of the resource usage of the application is classified into the known phase that appears when different applications are executed, and the recommended value of the container resource usage limit is shown on the basis of the resource usage data of the phase. There is a method which classifies the behavior of the resource usage data of a new application into the known phase and the unknown phase of the existing application and shows the degree of validation for the classification into each phase such that the cloud designer selects the setting value of the resource usage limit of the new application on the container resource usage limit value output screen 400.

In this example, it is assumed that there are existing applications a_0 to a_2, an unknown application a_3, and known phases p_c, p_p, and p_g.

The container resource usage limit value analysis screen 400 includes a recommended container size field 401, a new application resource usage data pattern display field 410, an execution phase display bar 421, and a container resource usage limit analysis table 431.

The container resource usage limit value selected from the container resource usage limit analysis table 431 by the cloud designer for a new application is displayed for each resource in the recommended container size field 401. In FIG. 11, "88" selected from p_g is displayed as the CPU usage limit value, and "85" selected from p_p is displayed as the virtual memory usage limit value.

The new application resource usage data pattern display field 410 is a field showing the transition of a new application resource usage data pattern over time. In the example illustrated in FIG. 11, a CPU load pattern 411 and a virtual memory usage pattern 412 are displayed.

For example, the results of classifying the phase of a new application over time are displayed in different colors in the execution phase display bar 421.

The container resource usage limit analysis table 431 includes an application display row 431a, a phase display row 431b, a CPU usage limit value row 431c, a virtual memory usage limit value row 431d, and a validation row, and each item is displayed so as to correspond to the rows.

The ID or name of an application is displayed in the application display row 431a. The ID or name of a phase is displayed in the phase display row 431b. The CPU usage limit value calculated by the cloud application deployment device 100 is displayed in the CPU usage limit value row 431c. The virtual memory usage limit value calculated by the cloud application deployment device 100 is displayed in the virtual memory usage limit value row 431d. The degree of validation for the classification into each phase is displayed in the validation row.

According to this embodiment, even for a new application, a feature vector obtained from resource usage data is validated to classify the new application into the known phase and the unknown phase, and the feature vectors of the known phases subjected by machine learning can be combined to generate a feature vector of the unknown phase with high accuracy.

Therefore, it is possible to efficiently obtain the feature vector of the unknown phase and thus to improve the accuracy of estimating the resource usage.

Embodiment 2

Figure 12:
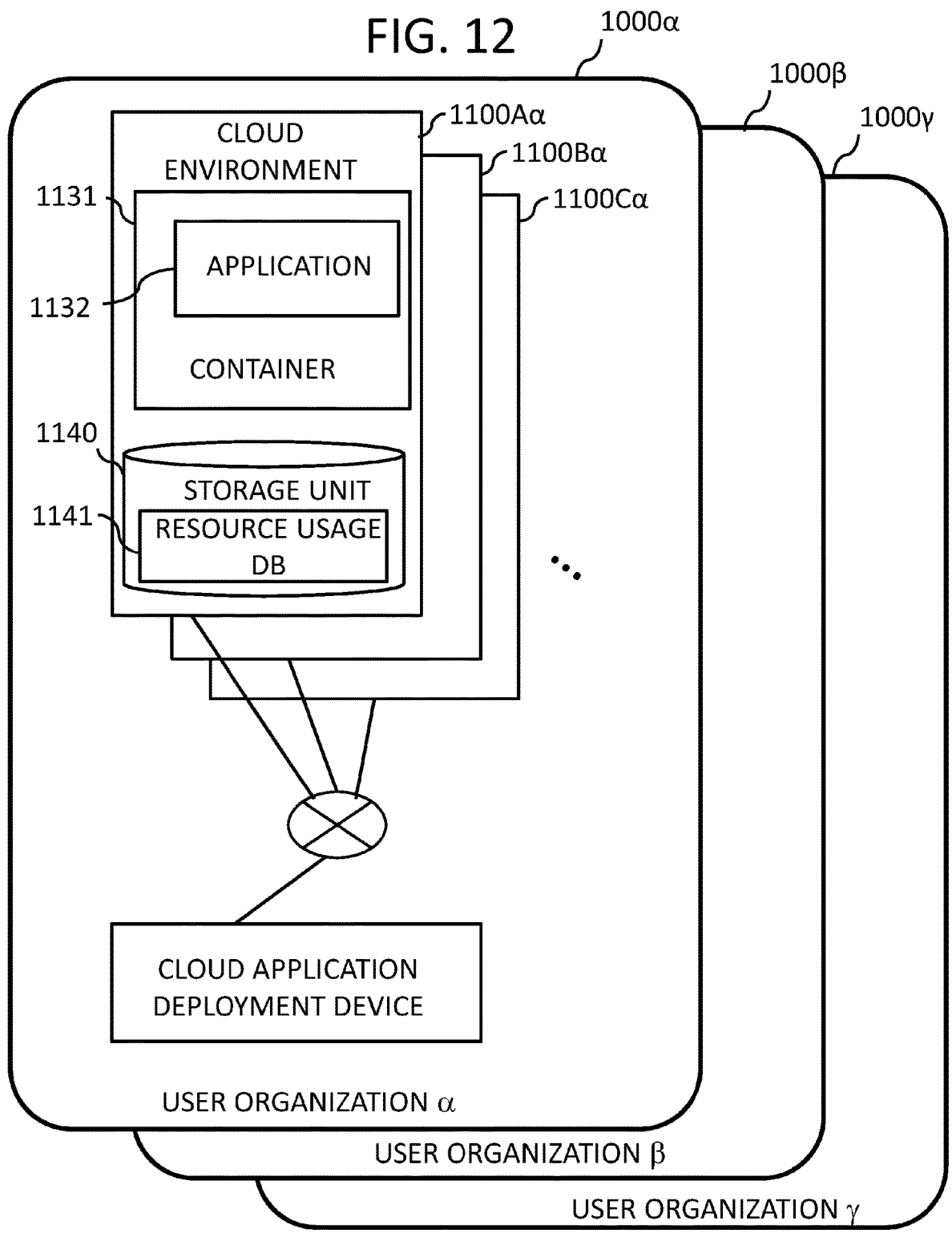
FIG. 12 is a diagram illustrating a configuration of a cloud system having the cloud application deployment device.

Next, Embodiment 2 of the invention will be described with reference to FIG. 12.

A cloud system according to this embodiment has a configuration in which each of a plurality of user organizations 1000 (represented by 1000α, 1000β, 1000γ, . . . in FIG. 12) has a plurality of cloud environments 1100 (represented by 1100αA, 1100αB, . . . in FIG. 12) and each user organization 1000 has the cloud application deployment device 100 according to Embodiment 1.

Then, each cloud environment 1100 includes a container 1131 for executing an application 1132 and a storage unit 1140. The storage unit 1140 stores a resource usage DB 1141 in the cloud.

According to this system, the cloud application deployment device 100 that optimally deploys the container is provided for each organization to which the user belongs, collects the resource usage data stored in the resource usage DB of each application executed by the user of the organization in a plurality of clouds, and creates a phase classification model and an expression for inferring resource usage and application performance as in Embodiment 1. This configuration makes it possible to achieve the optimum deployment of the containers in each cloud in the organization that performs large-scale data analysis for each user organization.

The invention claimed is:

1. A cloud application deployment device that deploys application software in a cloud environment on the basis of resource usage when the application software is executed,
wherein the cloud application deployment device stores resource usage data of a computer node in the cloud environment for each time period when the application software is executed,
calculates a feature vector for each time period from the resource usage data for each time period when the application software is executed,
clusters the feature vectors for each time period to create a cluster,
sets a time series of the time periods corresponding to the feature vectors of the cluster including the feature vectors as a phase of the application software,
includes a phase classification model that calculates the feature vector for each time period from the resource usage data for each time period when the application software is executed, clusters the feature vectors for each time period to create the cluster, and validates a result of the clustering to determine which phase the feature vector belongs to,
collects resource usage data of new application software for each time period when the new application software is executed,
performs validation between a feature vector for each time period when the new application software is executed and the feature vector belonging to the cluster created by the phase classification model of the known phase for which the phase classification model has already been obtained and determines whether each time period belongs to the known phase or an unknown phase on the basis of a degree of the validation,
infers the resource usage of the computer node for each phase of the application software, and
calculates a container resource usage limit of the computer node in the cloud environment on the basis of the resource usage of the computer node for each phase of the application software and deploys the application software on the basis of the container resource usage limit.

2. The cloud application deployment device according to claim 1,
wherein the feature vectors for each time period which belongs to the unknown phase of the new application software are combined as a direct product of feature vectors obtained by multiplying the feature vectors of one or more known phases by weighting coefficients.

3. The cloud application deployment device according to claim 2,
wherein the weighting coefficient is calculated from decoding accuracy evaluated from a loss function in a case in which a neural network encoding high-dimensional time-series data into a low-dimensional feature vector and a neural network decoding the feature vector into the resource usage data are trained at the same time when the feature vector for each time period is created from the resource usage data.

4. The cloud application deployment device according to claim 1,
wherein the phase classification model learns the unknown phase with the resource usage data accumulated by the execution of the new application software.

5. The cloud application deployment device according to claim 1,
wherein a performance inference expression for inferring a performance of the computer node is created for each phase of the application software,
a container resource usage limit of the computer node in the cloud environment is calculated on the basis of the performance inference expression, and
the application software is deployed on the basis of the container resource usage limit.

6. The cloud application deployment device according to claim 5,
wherein the performance inference expression is calculated by a slowdown function in which the performance of the computer node decreases according to the resource usage for each type of resource usage.

7. The cloud application deployment device according to claim 1,
wherein the degree of the validation is displayed for each time period.

8. A cloud application deployment method by a cloud application deployment device that deploys application software in a cloud environment on the basis of resource usage when the application software is executed, stores resource usage data of a computer node in the cloud environment for each time period when the application software is executed, sets a time series of the time periods corresponding to feature vectors of a cluster including the feature vectors as a phase of the application software, and includes a phase classification model that calculates the feature vector for each time period from the resource usage data for each time period when the application software is executed, clusters the feature vectors for each time period to create the cluster, and validates a result of the clustering to determine which phase the feature vector belongs to, the cloud application deployment method comprising:

- a step of allowing the cloud application deployment device to calculate the feature vector for each time period from the resource usage data for each time period when the application software is executed;
- a step of allowing the cloud application deployment device to cluster the feature vectors for each time period to create the cluster;
- a step of allowing the cloud application deployment device to collect resource usage data of new application software for each time period when the new application software is executed;
- a step of performing validation between a feature vector for each time period when the new application software is executed and the feature vector belonging to the cluster created by the phase classification model of the known phase for which the phase classification model has already been obtained and determining whether each time period belongs to the known phase or an unknown phase on the basis of a degree of the validation;
- a step of inferring the resource usage of the computer node for each phase of the application software;
- a step of calculating a container resource usage limit of the computer node in the cloud environment on the basis of the resource usage of the computer node for each phase of the application software; and
- a step of deploying the application software on the basis of the container resource usage limit.

9. The cloud application deployment method according to claim 8,
wherein the feature vectors for each time period which belongs to the unknown phase of the new application software are combined as a direct product of feature vectors obtained by multiplying the feature vectors of one or more known phases by weighting coefficients.

10. The cloud application deployment method according to claim 9,
wherein the weighting coefficient is calculated from decoding accuracy evaluated from a loss function in a case in which a neural network encoding high-dimensional time-series data into a low-dimensional feature vector and a neural network decoding the feature vector into the resource usage data are trained at the same time when the feature vector for each time period is created from the resource usage data.

* * * * *